(12) United States Patent
Ito

(10) Patent No.: US 12,146,058 B2
(45) Date of Patent: Nov. 19, 2024

(54) METHOD FOR PRODUCING AROMATIC POLYSULFONE

(71) Applicant: SUMITOMO CHEMICAL COMPANY, LIMITED, Tokyo (JP)

(72) Inventor: Kazuyuki Ito, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 612 days.

(21) Appl. No.: 17/291,225

(22) PCT Filed: Nov. 12, 2019

(86) PCT No.: PCT/JP2019/044256
§ 371 (c)(1),
(2) Date: May 4, 2021

(87) PCT Pub. No.: WO2020/100858
PCT Pub. Date: May 22, 2020

(65) Prior Publication Data
US 2021/0403715 A1  Dec. 30, 2021

(30) Foreign Application Priority Data
Nov. 14, 2018 (JP) .................. 2018-213834

(51) Int. Cl.
*C08L 81/06* (2006.01)
*C08G 75/20* (2016.01)

(52) U.S. Cl.
CPC ......... *C08L 81/06* (2013.01); *C08G 75/20* (2013.01); *C08L 2201/08* (2013.01)

(58) Field of Classification Search
CPC ................... C08L 81/06; C08G 75/20
See application file for complete search history.

(56) References Cited

U.S. PATENT DOCUMENTS

| 4,175,175 A | 11/1979 | Johnson et al. | |
|---|---|---|---|
| 4,176,222 A * | 11/1979 | Cinderey | C08G 65/4012 528/125 |
| 4,331,798 A | 5/1982 | Staniland | |
| 2002/0010307 A1 * | 1/2002 | Schwab | C08G 75/23 528/174 |
| 2011/0224386 A1 | 9/2011 | Weber et al. | |
| 2011/0311816 A1 | 12/2011 | Kanomata et al. | |
| 2012/0149796 A1 | 6/2012 | Weber et al. | |

FOREIGN PATENT DOCUMENTS

| CN | 108285535 A | 7/2018 | |
|---|---|---|---|
| CN | 110183660 A | 8/2019 | |
| EP | 0 010 868 A2 | 5/1980 | |
| EP | 0 278 720 A2 | 8/1988 | |
| ES | 485413 A1 * | 7/1980 | ............. C08G 75/23 |
| GB | 1133561 A | 11/1968 | |
| JP | 45-021318 B1 | 7/1970 | |
| JP | 55-089334 A | 7/1980 | |
| JP | 2004-107606 A | 4/2004 | |
| JP | 2012-509375 A | 4/2012 | |
| JP | 2013-502476 A | 1/2013 | |
| JP | 2014-071239 A | 4/2014 | |
| WO | 01/66620 A2 | 9/2001 | |
| WO | 2009/022591 A1 | 2/2009 | |
| WO | WO-2018188942 A1 * | 10/2018 | ........... C07C 317/00 |

OTHER PUBLICATIONS

Staniland ES 485,413 A1 (trans.) (Year: 1980).*
International Search Report issued in corresponding International Patent Application No. PCT/JP2019/044256, dated Feb. 4, 2020, with English translation.
Chinese Office Action issued in corresponding Chinese Patent Application No. 201980073916.0, dated Jan. 18, 2023, with English translation.
Japanese Notice of Reasons for Refusal issued in corresponding Japanese Patent Application No. 2020-555700, dated May 9, 2023, with English translation.
Extended European Search Report issued in corresponding European Patent Application No. 19884270.0-1102, dated Jul. 25, 2022.
Chinese Office Action dated Sep. 21, 2023 issued in the corresponding Chinese Patent Application No. 201980073916.0, with English translation.
Jia Huaping, "Cement Production Technology and Practice" China Building Materials Industry Press, p. 129, Jan. 31, 2018, English translation.
Communication pursuant to Article 94(3) EPC received in EP Patent Application No. 19884270.0, dated Mar. 22, 2024.

* cited by examiner

*Primary Examiner* — Robert C Boyle
*Assistant Examiner* — Patrick Loen Benitez
(74) *Attorney, Agent, or Firm* — Rimon P.C.

(57) ABSTRACT

A method for producing an aromatic polysulfone that includes subjecting 4,4'-dichlorodiphenylsulfone and an aromatic dihydroxy compound to a polycondensation reaction, wherein the median diameter (D50) of the 4,4'-dichlorodiphenylsulfone is not more than 1,000 μm.

8 Claims, No Drawings

METHOD FOR PRODUCING AROMATIC POLYSULFONE

CROSS REFERENCE TO RELATED APPLICATIONS

This application is the U.S. National Phase under 35 U.S.C. § 371 of International Application No. PCT/JP2019/044256, filed on Nov. 12, 2019, which claims the benefit of Japanese Application No. 2018-213834, filed on Nov. 14, 2018, the entire contents of each are hereby incorporated by reference.

TECHNICAL FIELD

The present invention relates to a method for producing an aromatic polysulfone.

BACKGROUND ART

Aromatic polysulfones exhibit excellent heat resistance and chemical resistance, and are therefore used as materials for molded bodies in a variety of applications. Aromatic polysulfones are typically produced by subjecting an aromatic dihalogenosulfone compound and an aromatic dihydroxy compound to a polycondensation reaction in the presence of both a base and a reaction solvent (for example, see Patent Documents 1 and 2).

The compound 4,4'-dichlorodiphenylsulfone (namely, bis(4-chlorophenyl)sulfone) is widely used as the aromatic dihalogenosulfone compound.

CITATION LIST

Patent Documents

Patent Document 1: JP 2012-509375 A
Patent Document 2: JP 2013-502476 A

SUMMARY OF THE INVENTION

Problems to be Solved by the Invention

From the viewpoints of energy efficiency and the like, the temperature when subjecting 4,4'-dichlorodiphenylsulfone and an aromatic dihydroxy compound to a polycondensation reaction is preferably as low a temperature as possible. However, when the temperature of the polycondensation reaction is set to a comparatively low level, the progression of the polycondensation reaction slows.

An object of the present invention is to provide a method for producing an aromatic polysulfone that enables the polycondensation reaction to proceed rapidly even at comparatively low temperatures.

Means to Solve the Problems

In order to achieve this object, the present invention includes the following aspects.

[1] A method for producing an aromatic polysulfone that includes subjecting 4,4'-dichlorodiphenylsulfone and an aromatic dihydroxy compound to a polycondensation reaction, wherein
    the median diameter (D50) of the 4,4'-dichlorodiphenylsulfone is not more than 1,000 μm.

[2] The method for producing an aromatic polysulfone according to [1], wherein the polycondensation reaction is conducted in the presence of an aprotic polar solvent, or in the presence of an aprotic polar solvent and an additional solvent that forms an azeotropic mixture with water, and
    the boiling point of the aprotic polar solvent is not more than 250° C., or the boiling point of the additional solvent that forms an azeotropic mixture with water is not more than 250° C.

[3] The method for producing an aromatic polysulfone according to [1] or [2], wherein the polycondensation reaction is conducted at a temperature of not more than 250° C.

Effects of the Invention

The method for producing an aromatic polysulfone of the present invention enables the polycondensation reaction to proceed rapidly even at comparatively low temperatures.

EMBODIMENTS FOR CARRYING OUT THE INVENTION

<<Method for Producing Aromatic Polysulfone>>

One embodiment of the present invention is a method for producing an aromatic polysulfone that includes subjecting 4,4'-dichlorodiphenylsulfone and an aromatic dihydroxy compound to a polycondensation reaction, wherein the median diameter (D50) of the 4,4'-dichlorodiphenylsulfone is not more than 1,000 μm.

In the polycondensation reaction between 4,4'-dichlorodiphenylsulfone and an aromatic dihydroxy compound, in those cases where the temperature of the polycondensation reaction is set to a comparatively low value (for example, set to 250° C. or lower), even in the absence of a reaction solvent, the polycondensation reaction may sometimes proceed with the 4,4'-dichlorodiphenylsulfone still in a dispersed state without having dissolved. Further, 4,4'-dichlorodiphenylsulfone is typically available as comparatively large particles with a median diameter (D50) within a range from about 2,000 μm to about 1 cm. Rather than simply supplying these large particles of 4,4'-dichlorodiphenylsulfone to the polycondensation reaction, by grinding the particles with a grinder to reduce the median diameter (D50) of the 4,4'-dichlorodiphenylsulfone to not more than 1,000 μm, and then using these particles of reduced particle diameter, the polycondensation reaction can be made to proceed more rapidly.

In this description, the median diameter (D50) of 4,4'-dichlorodiphenylsulfone refers to the value obtained by measuring the particle diameters and volume fractions of the 4,4'-dichlorodiphenylsulfone using the laser diffraction method, and totaling the volume fractions in sequence from the smallest particle diameter, with the particle diameter of the particle where the cumulative volume reaches 50% relative to the total volume of all of the particles being deemed the median diameter (D50).

The particle diameters and volume fractions of the 4,4'-dichlorodiphenylsulfone can be measured using the measurement method described in the examples described below.

The median diameter (D50) of the 4,4'-dichlorodiphenylsulfone is not more than 1,000 μm, and is preferably not more than 600 μm, and more preferably 400 μm or less. The smaller the median diameter (D50) of the 4,4'-dichlorodiphenylsulfone becomes, the more rapidly the 4,4'-dichlorodiphenylsulfone can be dispersed with the aromatic dihydroxy compound and the reaction solvent. Although there are no particular limitations on the lower limit for the median diameter (D50) of the 4,4'-dichlorodiphenylsulfone, in terms of facilitating the grinding in the grinder, the median diameter (D50) may be at least 10 µm, at least 20 µm, or 40 µm or greater.

In one aspect, the median diameter (D50) of the 4,4'-dichlorodiphenylsulfone is at least 10 µm but not more than 1,000 µm, and may be at least 20 µm but not more than 600 µm, or at least 40 µm but not more than 400 µm.

In another aspect, the median diameter (D50) may be at least 100 µm but not more than 400 µm, at least 100 µm but not more than 200 µm, or at least 100 µm but not more than 184 µm. Moreover, from the viewpoint of increasing the reaction speed, the median diameter (D50) of the 4,4'-dichlorodiphenylsulfone may be at least 200 µm but not more than 400 µm. If D50 is too small, then reaggregation becomes more likely, which can reduce the reaction rate. It is thought that by controlling the D50 value within this range, the reaction rate can be increased while moderating any reaggregation.

The aromatic dihydroxy compound may be any compound having an aromatic ring and two hydroxyl groups within a single molecule. The aromatic dihydroxy compound may be, for example, a compound represented by formula (1) shown below (hereinafter sometimes referred to as "the compound (1)").

$$\text{HO-Ph}^1\text{-SO}_2\text{-Ph}^2\text{-OH} \quad (1)$$

[In formula (1), $Ph^1$ and $Ph^e$ each represent a phenylene group, wherein one or more hydrogen atoms bonded to the phenylene group may each be independently substituted with an alkyl group of 1 to 10 carbon atoms, an aryl group of 6 to 20 carbon atoms or a halogen atom.]

Examples of the compound (1) include bis(4-hydroxyphenyl)sulfone (also called 4,4'-dihydroxydiphenylsulfone), bis(4-hydroxy-3,5-dimethylphenyl)sulfone and bis(4-hydroxy-3-phenylphenyl)sulfone.

The aromatic dihydroxy compound may be, for example, a compound represented by formula (2) shown below (hereinafter sometimes referred to as "the compound (2)").

$$\text{HO-Ph}^3\text{-R-Ph}^4\text{-OH} \quad (2)$$

[In formula (2), $Ph^3$ and $Ph^4$ each represent a phenylene group, wherein one or more hydrogen atoms of the phenylene group may each be independently substituted with an alkyl group of 1 to 10 carbon atoms, an aryl group of 6 to 20 carbon atoms or a halogen atom. R represents an alkylidene group of 1 to 5 carbon atoms, an oxygen atom or a sulfur atom.]

Examples of the compound (2) include 2,2-bis(4-hydroxyphenyl)propane, 2,2-bis(4-hydroxyphenyl)hexafluoropropane, bis(4-hydroxyphenyl) sulfide, bis(4-hydroxy-3-methylphenyl) sulfide and bis(4-hydroxyphenyl) ether.

The aromatic dihydroxy compound may be, for example, a compound represented by formula (3) shown below (hereinafter sometimes referred to as "the compound (3)").

$$\text{HO-(Ph}^5)_n\text{-OH} \quad (3)$$

[In formula (3), $Ph^5$ represents a phenylene group, wherein one or more hydrogen atoms of the phenylene group may each be independently substituted with an alkyl group of 1 to 10 carbon atoms, an aryl group of 6 to 20 carbon atoms or a halogen atom. Further, n represents an integer of 1 to 4, and when n is 2 or greater, the plurality of $Ph^5$ groups may be the same or different.]

Examples of the compound (3) include hydroquinone, resorcin, catechol, phenylhydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl. Among these, hydroquinone, resorcin, catechol, phenylhydroquinone, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl are preferred.

Among the various possibilities described above, 4,4'-dihydroxydiphenylsulfone is particularly preferred as the aromatic dihydroxy compound according to an embodiment of the present invention.

The blend ratio of the 4,4'-dichlorodiphenylsulfone, per 1 mol of the aromatic dihydroxy compound, is typically at least 0.95 mol but not more than 1.05 mol, preferably at least 0.96 mol but not more than 1.04 mol, and more preferably at least 0.97 mol but not more than 1.03 mol. In one aspect, the blend ratio may be at least 0.98 mol but not more than 1.00 mol, or at least 0.98 mol but not more than 0.995 mol.

Provided the blend ratio is at least 0.95 mol but not more than 1.05 mol, the molecular weight of the obtained aromatic polysulfone tends to increase, which is desirable.

By subjecting the 4,4'-dichlorodiphenylsulfone and the compound (1) to a polycondensation reaction, an aromatic polysulfone having a repeating unit represented by formula (4) shown below can be produced.

$$\text{-Ph-SO}_2\text{-Ph-O-Ph}^1\text{-SO}_2\text{-Ph}^2\text{-O-} \quad (4)$$

[In formula (4), Ph represents a phenylene group, and $Ph^1$ and $Ph^2$ are as defined above.]

By subjecting the 4,4'-dichlorodiphenylsulfone and the compound (2) to a polycondensation reaction, an aromatic polysulfone having a repeating unit represented by formula (5) shown below can be produced.

$$\text{-Ph-SO}_2\text{-Ph-O-Ph}^3\text{-R-Ph}^4\text{-O-} \quad (5)$$

[In formula (5), Ph, $Ph^1$ and $Ph^4$ are as defined above.]

By subjecting the 4,4'-dichlorodiphenylsulfone and the compound (3) to a polycondensation reaction, an aromatic polysulfone having a repeating unit represented by formula (6) shown below can be produced.

$$\text{-Ph-SO}_2\text{-Ph-O-(Ph}^5)_n\text{-O-} \quad (6)$$

[In formula (6), Ph, $Ph^5$ and n are as defined above.]

In an embodiment of the present invention, a compound having a halogeno group and a hydroxyl group in the molecule, such as 4-hydroxy-4'-(4-chlorophenylsulfonyl)biphenyl, may be used instead of some or all of the aromatic dihydroxy compound.

In an embodiment of the present invention, a single aromatic dihydroxy compound may be used alone, or a combination of two or more aromatic dihydroxy compounds may be used, depending on the type of aromatic polysulfone being targeted.

In one aspect, the polycondensation reaction according to an embodiment of the present invention is preferably conducted in the presence of an aprotic polar solvent, and the aprotic polar solvent preferably has a boiling point of not more than 250° C. By using an aprotic polar solvent with a boiling point of not more than 250° C., the polycondensation reaction can be made to proceed by refluxing the aprotic polar solvent at a comparatively low temperature (for example, at least 120° C. but not more than 250° C.) while removing by-products.

The boiling point of the aprotic polar solvent is preferably not more than 250° C., and may be not more than 230° C., or may be 210° C. or lower. The boiling point of the aprotic polar solvent may be at least 120° C., at least 140° C., or 150° C. or higher.

In one aspect, the boiling point of the aprotic polar solvent is preferably at least 120° C. but not more than 250° C., and may be at least 140° C. but not more than 230° C., or at least 150° C. but not more than 210° C.

Examples of the aprotic polar solvent with a boiling point of not more than 250° C. include sulfone-based solvents such as dimethylsulfone and diethylsulfone, amide-based solvents such as N,N-di methylacetamide, N-methylpyrrolidone, N-ethyl pyrrolidone, n-methylcaprolactam, N,N-dimethylformamide, N,N-diethylformamide, N,N-diethylacetamide, N-methylpropionamide and dimethylimidazolidinone, lactone-based solvents such as γ-butyrolactone and β-butyrolactone, sulfoxide-based solvents such as methyl sulfoxide and methyl phenyl sulfoxide, cellosolve-based solvents such as tetramethylphosphoramide and hexamethylphosphoramide, and cellosolve-based solvents such as ethyl cellosolve acetate and methyl cellosolve acetate.

Among the above solvents, N-methylpyrrolidone is preferred as the aprotic polar solvent with a boiling point of not more than 250° C.

In another aspect, the polycondensation reaction according to an embodiment of the present invention is preferably conducted in the presence of an aprotic polar solvent and an additional solvent that forms an azeotropic mixture with water, and the boiling of the additional solvent that forms an azeotropic mixture with water is preferably not more than 250° C. By using an additional solvent that forms an azeotropic mixture with water together with an aprotic polar solvent, the water that is formed as a by-product during the polycondensation reaction can be removed by continuous azeotropic distillation from the start of the polycondensation reaction until the finish, and by using an additional solvent that forms an azeotropic mixture with water and has a boiling point of not more than 250° C., the polycondensation reaction can be made to proceed while the by-product is removed at a comparatively low temperature (for example, at least 120° C. but not more than 250° C.).

The boiling point of the additional solvent that forms an azeotropic mixture with water is preferably not more than 250° C., and may be not more than 230° C., or may be 210° C. or lower. The boiling point of the additional solvent that forms an azeotropic mixture with water may be at least 40° C., at least 80° C., or 100° C. or higher.

In one aspect, the boiling point of the additional solvent that forms an azeotropic mixture with water is preferably at least 40° C. but not more than 250° C., and may be at least 80° C. but not more than 230° C., or at least 100° C. but not more than 210° C.

In this description, the expression "additional solvent that forms an azeotropic mixture with water" means a solvent that is different from the aprotic polar solvent described above and the raw material compounds and products of the polycondensation reaction.

In those cases where the polycondensation reaction is conducted in the presence of an aprotic polar solvent and an additional solvent that forms an azeotropic mixture with water and has a boiling point of not more than 250° C., the boiling point of the aprotic polar solvent may exceed 250° C. Examples of aprotic polar solvents with a boiling point exceeding 250° C. include sulfone-based solvents such as diphenylsulfone and sulfolane. Examples of the additional solvent that forms an azeotropic mixture with water and has a boiling point of not more than 250° C. include benzene, chlorobenzene, toluene, xylene, ethylbenzene, methyl isobutyl ketone, hexane and cyclohexane.

In one aspect, the polycondensation reaction according to an embodiment of the present invention may be conducted in the presence of at least one solvent selected from the group consisting of diphenylsulfone and sulfolane, and at least one solvent selected from the group consisting of benzene, chlorobenzene, toluene, xylene, ethylbenzene, methyl isobutyl ketone, hexane and cyclohexane.

In one aspect, the blend amount of the aprotic polar solvent, or the aprotic polar solvent and the additional solvent that forms an azeotropic mixture with water, is preferably within a range from 80% by weight to 1,000% by weight relative to the total weight (100% by weight) of the 4,4'-dichlorodiphenylsulfone and the aromatic dihydroxy compound.

In those cases where both an aprotic polar solvent and an additional solvent that forms an azeotropic mixture with water and has a boiling point of not more than 250° C. are used, the ratio of (blend amount of aprotic polar solvent):(blend amount of additional solvent that forms an azeotropic mixture with water and has a boiling point of not more than 250° C.) is preferably within a range from 1:5 to 1:1.

The polycondensation reaction between 4,4'-dichlorodiphenylsulfone and an aromatic dihydroxy compound is preferably conducted using an alkali metal salt of carbonic acid as a catalytic base. Further, the polycondensation reaction is preferably conducted in an organic solvent (namely, an aprotic polar solvent, or an aprotic polar solvent and an additional solvent that forms an azeotropic mixture with water) as the solvent, and is more preferably conducted within an organic solvent using an alkali metal salt of carbonic acid as a base.

The alkali metal salt of carbonic acid may be a normal alkali carbonate salt (namely, a carbonate salt of an alkali metal), may be an acidic alkali bicarbonate salt (namely, an alkali hydrogen carbonate, a hydrogen carbonate salt of an alkali metal), or may be a mixture of these salts (an alkali carbonate and an alkali bicarbonate). Examples of preferred alkali carbonates include sodium carbonate and potassium carbonate. Examples of preferred alkali bicarbonates include sodium bicarbonate (namely, sodium hydrogen carbonate) and potassium bicarbonate (namely, potassium hydrogen carbonate).

Among the above salts, potassium carbonate is preferred.

The blend ratio of the alkali metal salt of carbonic acid, expressed in terms of the amount of the alkali metal per 1 mol of the aromatic dihydroxy compound, is preferably at least 0.90 mol but not more than 1.30 mol, and more preferably at least 0.95 mol but not more than 1.20 mol. In another aspect, the blend ratio of the alkali metal salt of carbonic acid, expressed in terms of the amount of the alkali metal per 1 mol of the aromatic dihydroxy compound, may be at least 0.95 mol but not more than 1.05 mol.

Assuming that side reactions in which the ether portion undergoes hydrolysis do not occur, the larger the usage ratio of the alkali metal salt of carbonic acid, the more rapidly the targeted polycondensation reaction proceeds, and therefore the degree of polymerization of the obtained aromatic polysulfone tends to increase, resulting in a higher weight average molecular weight (Mw) for the aromatic polysulfone.

However, in actuality, the larger the usage ratio of the alkali metal salt of carbonic acid, the more likely similar side reactions to those described above are to occur, and these side reactions cause a decrease in the degree of polymerization of the obtained aromatic polysulfone. The usage ratio of the alkali metal salt of carbonic acid must be adjusted with due consideration of the extent of these side reactions, so that an aromatic polysulfone having a predetermined weight average molecular weight (Mw) can be obtained.

In this description, the expression that "the polycondensation reaction proceeds rapidly" means that an aromatic polysulfone of high molecular weight is obtained in a short period of time, and this can be evaluated by the relationship between the polymerization time and the result of measuring the molecular weight of the obtained aromatic polysulfone.

The method for producing an aromatic polysulfone of an embodiment of the present invention may include, for example, a first stage to a third stage described below.

To begin with, in the first stage, the 4,4'-dichlorodiphenylsulfone and the aromatic dihydroxy compound are dispersed or dissolved in an organic solvent. Either the aforementioned aprotic polar solvent with a boiling point of not more than 250° C., or the aforementioned aprotic polar solvent and an additional solvent that forms an azeotropic mixture with water and has a boiling point of not more than 250° C. may be used as the organic solvent. The temperature during the dispersion or dissolution of the first stage is preferably at least 10° C. but not more than 180° C., more preferably at least 10° C. but not more than 120° C., particularly preferably at least 10° C. but not more than 80° C., and most preferably at least 10° C. but not more than 40° C.

The point where the mixture of the 4,4'-dichlorodiphenylsulfone, the aromatic dihydroxy compound and the organic solvent reaches a uniform state is deemed the end of the first stage.

In the second stage, an alkali metal salt of carbonic acid is added to the dispersion obtained in the first stage, and the 4,4'-dichlorodiphenylsulfone and the aromatic dihydroxy compound are subjected to a polycondensation reaction.

The polycondensation reaction of the second stage is preferably conducted at a temperature of not more than 250° C. By conducting the polycondensation reaction at a comparatively low temperature of not more than 250° C., the energy load can be kept low, and by using 4,4'-dichlorodiphenylsulfone having a median diameter (D50) of not more than 1,000 μm, the polycondensation reaction is able to proceed rapidly. The temperature of the polycondensation reaction is preferably not more than 250° C., and may be not more than 230° C., or may be 210° C. or lower.

Assuming that side reactions do not occur, the higher the temperature of the polycondensation reaction, the more rapidly the targeted polycondensation reaction proceeds, and therefore the degree of polymerization of the obtained aromatic polysulfone tends to increase, resulting in a higher weight average molecular weight (Mw) for the aromatic polysulfone. However, in actuality, the higher the temperature of the polycondensation reaction, the more likely side reactions are to occur, and because these side reactions cause a decrease in the degree of polymerization of the obtained aromatic polysulfone, the temperature of the polycondensation reaction is preferably adjusted with due consideration of the extent of these side reactions, so that an aromatic polysulfone having a predetermined weight average molecular weight (Mw) can be obtained. Although there are no limitations on the lower limit for the temperature of the polycondensation reaction, the temperature may be at least 100° C., at least 120° C., or 140° C. or higher.

In one aspect, the temperature of the polycondensation reaction is preferably at least 100° C. but not more than 250° C., and may be at least 120° C. but not more than 230° C., or may be at least 140° C. but not more than 210° C.

The weight average molecular weight (Mw) of the aromatic polysulfone obtained using the production method of an embodiment of the present invention may be within a range from 10,000 to 500,000, may be within a range from 20,000 to 400,000, or may be within a range from 30,000 to 300,000. In another aspect, the weight average molecular weight may be within a range from 40,000 to 120,000.

In this description, the weight average molecular weight (Mw), the number average molecular weight (Mn) and the polydispersity (Mw/Mn) of the aromatic polysulfone can be measured and calculated using the methods described below in the examples, in the section entitled <Measurement of Mn and Mw of Aromatic Polysulfone, Calculation of Mw/Mn>.

The polydispersity (Mw/Mn) of the aromatic polysulfone obtained using the production method of an embodiment of the present invention is preferably within a range from 3.6 to 7.3, but may be from 1.8 to 10.0.

The polycondensation reaction of the second stage is typically conducted by gradually raising the temperature while removing by-product water, and once the reflux temperature of the organic solvent has been reached, maintaining that temperature, preferably for at least 1 hour but not more than 30 hours, and more preferably for at least 2 hours but not more than 15 hours. Assuming that side reactions do not occur, the longer the time of the polycondensation reaction, the more the targeted polycondensation reaction proceeds, meaning the degree of polymerization of the obtained aromatic polysulfone tends to increase, resulting in a higher weight average molecular weight (Mw) for the aromatic polysulfone. However, in actuality, the longer the time of the polycondensation reaction, the more side reactions similar to those described above proceed, and because these side reactions cause a decrease in the degree of polymerization of the obtained aromatic polysulfone, the polycondensation reaction time is preferably adjusted with due consideration of the extent of these side reactions, so that an aromatic polysulfone having a predetermined weight average molecular weight (Mw) can be obtained.

The point where the weight average molecular weight of the obtained aromatic polysulfone reaches a predetermined weight average molecular weight is deemed the end of the second stage.

In the third stage, any unreacted base, by-products (alkali halides in the case where an alkali metal salt is used as the base) and the organic solvent are removed by filtration, extraction and/or centrifugal separation or the like, thus obtaining the aromatic polysulfone.

Removal of the organic solvent may be conducted by distilling the organic solvent directly from the solution described above, or may be conducted by mixing the solution with a poor solvent for the aromatic polysulfone to precipitate the aromatic polysulfone, and then separating the aromatic polysulfone by filtration or centrifugal separation or the like. A predetermined amount of the organic solvent may also be retained.

Examples of poor solvents for the aromatic polysulfone include methanol, ethanol, 2-propanol, acetone, hexane, heptane and water, and in terms of being inexpensive, water and methanol are preferred.

In an embodiment of the present invention, a single solvent may be used alone as the poor solvent for the aromatic polysulfone, or a combination of two or more solvents may be used.

In one aspect, the method for producing an aromatic polysulfone that represents an embodiment of the present invention comprises:
- a first stage that includes dispersing or dissolving the 4,4'-dichlorodiphenylsulfone and the aromatic dihydroxy compound (and preferably 4,4'-dihydroxydiphenylsulfone) in an organic solvent to obtain a dispersion,
- a second stage that includes adding an alkali metal salt of carbonic acid to the dispersion, and subjecting the 4,4'-dichlorodiphenylsulfone and the aromatic dihydroxy compound to a polycondensation reaction, and
- a third stage that includes removing any unreacted base, by-products and the organic solvent from the reaction mixture obtained in the second stage to obtain an aromatic polysulfone; wherein
- the median diameter (D50) of the 4,4'-dichlorodiphenylsulfone is at least 10 μm but not more than 1,000 μm, may be at least 20 μm but not more than 600 μm, may be at least 40 μm but not more than 400 μm, may be at least 100 μm but not more than 400 μm, may be at least 100 μm but not more than 200 μm, or may be at least 100 μm but not more than 184 μm.

In the above production method, it is also preferable that the organic solvent is either an aprotic polar solvent with a boiling point of not more than 250° C. (and preferably N-methyl-2-pyrrolidone), or an aprotic polar solvent and an additional solvent that forms an azeotropic mixture with water and has a boiling point of not more than 250° C. (and preferably at least one solvent selected from the group consisting of benzene, chlorobenzene, toluene, xylene, ethylbenzene, methyl isobutyl ketone, hexane and cyclohexane).

Moreover, the temperature during the dispersion or dissolution of the first stage is preferably at least 10° C. but not more than 180° C., more preferably at least 10° C. but not more than 120° C., particularly preferably at least 10° C. but not more than 80° C., and most preferably at least 10° C. but not more than 40° C.

In addition, the temperature of the polycondensation reaction is preferably at least 100° C. but not more than 250° C., and may be at least 120° C. but not more than 230° C., or may be at least 140° C. but not more than 210° C., and
- the polycondensation reaction time is preferably at least 1 hour but not more than 30 hours, and more preferably at least 2 hours but not more than 15 hours.

Moreover, the third stage may include subjecting the reaction mixture obtained in the second stage to at least one operation selected from the group consisting of filtration, extraction and centrifugal separation.

Moreover, the blend ratio of the 4,4'-dichlorodiphenylsulfone, per 1 mol of the aromatic dihydroxy compound, is preferably at least 0.95 mol but not more than 1.05 mol, and may be at least 0.96 mol but not more than 1.04 mol, at least 0.97 mol but not more than 1.03 mol, at least 0.98 mol but not more than 1.00 mol, or at least 0.98 mol but not more than 0.995 mol.

In addition, the weight average molecular weight of the aromatic polysulfone obtained in the third stage is preferably within a range from 10,000 to 500,000, and may be within a range from 20,000 to 400,000, within a range from 30,000 to 300,000, or within a range from 40,000 to 120,000.

EXAMPLES

The present invention is described below in further detail using a series of specific examples. However, the present invention is in no way limited by the examples presented below.

<Measurement of Mn and Mw of Aromatic Polysulfone, Calculation of Mw/Mn>

The polystyrene-equivalent weight average molecular weight (Mw), the number average molecular weight (Mn) and the polydispersity (Mw/Mn) of the aromatic polysulfone were determined by GPC under the measurement conditions described below.

[Measurement Conditions]
Eluent: N,N-dimethylformamide solution containing 10 mM of lithium bromide
Sample preparation: The reaction liquid was diluted with the diluent in a ratio of 0.025 g of the aromatic polysulfone per 10 mL of the eluent, and the insoluble fraction (potassium chloride) was removed by filtration through a PTFE membrane filter with a pore size of 0.45 μm.
Sample injection volume: 10 μL
Columns (stationary phase): Two TSKgel Super HZM-M columns (4.6 mmø×150 mm) manufactured by Tosoh Corporation were connected in series.
Column temperature: 40° C.
Eluent (mobile phase): N,N-dimethylformamide solution containing 10 mM of lithium bromide
Eluent flow rate: 0.35 mL/min
Detector: UV detector (detection wavelength: 300 nm)
Molecular weight standards: standard polystyrenes <Calculation of Median Diameter (D50) of 4,4'-dichlorodiphenylsulfone>

Using a Microtrac particle size analyzer (MT-3300EXII) manufactured by Nikkiso Co., Ltd., the particle size and volume fraction of all particles of the 4,4'-dichlorodiphenylsulfone were measured using the laser diffraction method. The volumes were totaled in sequence from the smallest particle diameter, and the particle diameter of the particle where the cumulative volume reached 50% relative to the total volume of all of the particles was deemed the median diameter (D50).

When measuring the particle sizes and volumes, the 4,4'-dichlorodiphenylsulfone was dispersed in a surfactant-containing aqueous solution prepared by adding three drops of a surfactant (Tween 20) to 40 mL of water, thus obtaining a dispersion, this dispersion was inserted into the sample injection port of the above Microtrac particle size analyzer, the volume of the sample was increased to about 200 mL inside the circulation tank of the analyzer using the above surfactant-containing aqueous solution, and measurements were then conducted. The sample size of the 4,4'-dichlorodiphenylsulfone was adjusted to conform with the appropriate concentration range displayed on the analyzer.

Comparative Example 1

In a polymerization tank fitted with a stirrer, a nitrogen inlet tube, a thermometer, and a condenser with a receiver attached to the top end, 58.0 parts by mass of potassium carbonate (1.05 mol per 1 mol of 4,4'-dihydroxydiphenylsulfone), 112 parts by mass of 4,4'-dichlorodiphenylsulfone with a median diameter (D50) of 1,820 μm (0.980 mol per 1 mol of 4,4'-dihydroxydiphenylsulfone) and 100 parts by mass of 4,4'-dihydroxydiphenylsulfone were mixed into 213 parts by mass of N-methyl-2-pyrrolidone (hereinafter sometimes referred to as "NMP") at 30° C., and the temperature was then raised to 190° C. over a period of 1.5 hours. The temperature was then held at 190° C. to allow the 4,4'-dichlorodiphenylsulfone and the 4,4'-dihydroxydiphenylsulfone to undergo a polycondensation reaction.

The results of measuring the Mw and Mw/Mn values of the aromatic polysulfone after holding the temperature at 190° C. for 4 hours, 5 hours, and 6 hours are shown in Table 1.

Example 1-1

First, 4,4'-dichlorodiphenylsulfone with a median diameter (D50) of 1,820 μm was ground for 30 seconds using a small grinder (SM-1) manufactured by AS ONE Corporation to prepare a 4,4'-dichlorodiphenylsulfone with a median diameter (D50) of 184 μm.

With the exception of using the 4,4'-dichlorodiphenylsulfone with a median diameter (D50) of 184 μm, the 4,4'-dichlorodiphenylsulfone and the 4,4'-dihydroxydiphenylsulfone were subjected to a polycondensation reaction in a similar manner to Comparative Example 1.

The results of measuring the Mw and Mw/Mn values of the aromatic polysulfone after holding the temperature at 190° C. for 4 hours, 5 hours, and 6 hours are shown in Table 1.

Example 1-2

With the exception of using a 4,4'-dichlorodiphenylsulfone with a median diameter (D50) of 370 μm, the 4,4'-dichlorodiphenylsulfone and the 4,4'-dihydroxydiphenylsulfone were subjected to a polycondensation reaction in a similar manner to Comparative Example 1.

The results of measuring the Mw and Mw/Mn values of the aromatic polysulfone after holding the temperature at 190° C. for 4 hours, 5 hours, and 6 hours are shown in Table 1.

In Example 1-1 and Example 1-2 that used 4,4'-dichlorodiphenylsulfone with a median diameter (D50) of not more than 1,000 μm, the reaction rate was able to be increased compared with Comparative Example 1 that used 4,4'-dichlorodiphenylsulfone with a median diameter (D50) greater than 1,000 μm.

Comparative Example 2

With the exception of altering the amount of the 4,4'-dichlorodiphenylsulfone with a median diameter (D50) of 1,820 μm from 112 parts by mass to 114 parts by mass (0.995 mol per 1 mol of the 4,4'-dihydroxydiphenylsulfone), the 4,4'-dichlorodiphenylsulfone and the 4,4'-dihydroxydiphenylsulfone were subjected to a polycondensation reaction in a similar manner to Comparative Example 1.

The results of measuring the Mw and Mw/Mn values of the aromatic polysulfone after holding the temperature at 190° C. for 4 hours, 5 hours, and 6 hours are shown in Table 2.

Example 2-1

With the exception of using a 4,4'-dichlorodiphenylsulfone with a median diameter (D50) of 184 μm, the 4,4'-dichlorodiphenylsulfone and the 4,4'-dihydroxydiphenylsulfone were subjected to a polycondensation reaction in a similar manner to Comparative Example 2.

The results of measuring the Mw and Mw/Mn values of the aromatic polysulfone after holding the temperature at 190° C. for 4 hours, 5 hours, and 6 hours are shown in Table 2.

Example 2-1

With the exception of using a 4,4'-dichlorodiphenylsulfone with a median diameter (D50) of 370 μm, the 4,4'-dichlorodiphenylsulfone and the 4,4'-dihydroxydiphenylsulfone were subjected to a polycondensation reaction in a similar manner to Comparative Example 2.

The results of measuring the Mw and Mw/Mn values of the aromatic polysulfone after holding the temperature at 190° C. for 4 hours, 5 hours, and 6 hours are shown in Table 2.

TABLE 1

|  | D50 (μm) | Reaction holding time: 4h | | Reaction holding time: 5h | | Reaction holding time: 6h | |
| --- | --- | --- | --- | --- | --- | --- | --- |
|  |  | Mw | Mw/Mn | Mw | Mw/Mn | Mw | Mw/Mn |
| Comparative Example 1 | 1820 | 41,500 | 4 | 52,400 | 4.3 | 56,600 | 4.4 |
| Example 1-1 | 184 | 44,100 | 4.1 | 54,600 | 4.4 | 59,600 | 4.5 |
| Example 1-2 | 370 | 43,800 | 6.5 | 57,800 | 6.9 | 66,000 | 6.9 |

TABLE 2

| | D50 (μm) | Reaction holding time: 4h | | Reaction holding time: 5h | | Reaction holding time: 6h | |
|---|---|---|---|---|---|---|---|
| | | Mw | Mw/Mn | Mw | Mw/Mn | Mw | Mw/Mn |
| Comparative Example 2 | 1820 | 41,500 | 3.4 | 49,700 | 3.5 | 57,000 | 3.6 |
| Example 2-1 | 184 | 60,600 | 3.6 | 85,900 | 3.9 | 107,000 | 4.2 |
| Example 2-2 | 370 | 64,500 | 6.4 | 91,500 | 7 | 111,100 | 7.3 |

In Example 2-1 and Example 2-2 that used 4,4'-dichlorodiphenylsulfone with a median diameter (DSO) of not more than 1,000 μm, the reaction rate was able to be significantly increased compared with Comparative Example 2 that used 4,4'-dichlorodiphenylsulfone with a median diameter (D50) greater than 1,000 μm.

INDUSTRIAL APPLICABILITY

The method for producing an aromatic polysulfone of the present invention enables the polycondensation reaction to proceed rapidly even at comparatively low temperatures, and is therefore very useful. The aromatic polysulfone obtained from the production method of the present invention exhibits excellent heat resistance and chemical resistance, and therefore use as a material for molded bodies in a variety of applications can be anticipated.

The invention claimed is:

1. A method for producing an aromatic polysulfone comprising:
producing 4,4'-dichlorodiphenylsulfone with a median diameter (D50) of at least 100 μm but not more than 400 μm by grinding particles of 4,4'-dichlorodiphenylsulfone with a grinder;
a first step of dispersing or dissolving 4,4'-dichlorodiphenylsulfone with the median diameter (D50) of at least 100 μm but not more than 400 μm and an aromatic dihydroxy compound in (i) an aprotic polar solvent with a boiling point of not more than 250° C., or (ii) an aprotic polar solvent and an additional solvent that forms an azeotropic mixture with water and has a boiling point of not more than 250° C., at a temperature of at least 10° C. but not more than 40° C.; and
a second step of adding an alkali metal salt of carbonic acid to a dispersion obtained in the first step, and subjecting the 4,4'-dichlorodiphenylsulfone and the aromatic dihydroxy compound to a polycondensation reaction at a temperature of not more than 250° C.

2. The method for producing an aromatic polysulfone according to claim 1, wherein the polycondensation reaction is conducted at a temperature of not more than 230° C.

3. The method for producing an aromatic polysulfone according to claim 1, wherein a blend ratio of the 4,4'-dichlorodiphenylsulfone, per 1 mol of the aromatic dihydroxy compound, is at least 0.98 mol but not more than 0.995 mol.

4. The method for producing an aromatic polysulfone according to claim 1, wherein the aromatic dihydroxy compound is 4,4'-dihydroxydiphenylsulfone.

5. The method for producing an aromatic polysulfone according to claim 1, wherein
the boiling point of the aprotic polar solvent is at least 140° C. but not more than 230° C., or the boiling point of the additional solvent that forms an azeotropic mixture with water is at least 80° C. but not more than 230° C.

6. The method for producing an aromatic polysulfone according to claim 1, wherein the aprotic polar solvent is N-methylpyrrolidone.

7. The method for producing an aromatic polysulfone according to claim 1, wherein
a blend amount of the aprotic polar solvent, or the aprotic polar solvent and the additional solvent that forms an azeotropic mixture with water, is within a range from 80% by weight to 1,000% by weight relative to a total weight of the 4,4'-dichlorodiphenylsulfone and the aromatic dihydroxy compound.

8. The method for producing an aromatic polysulfone according to claim 1, further comprising a third step of performing at least one operation selected from the group consisting of filtration, extraction and centrifugal separation, on a reaction mixture obtained in the second step, to remove any unreacted alkali metal salt of carbonic acid, by-products, the aprotic polar solvent, and the additional solvent from the reaction mixture to obtain the aromatic polysulfone.

* * * * *